United States Patent [19]

Hemmerich

[11] 4,328,079
[45] May 4, 1982

[54] METHOD FOR PUMPING IMPURITIES, ESPECIALLY NOBLE GASES, FROM HYDROGEN OR MIXTURES OF HYDROGEN AND ITS ISOTOPES

[75] Inventor: Johann Hemmerich, Stetternich, Fed. Rep. of Germany

[73] Assignee: The Cyclotron Corporation, Berkeley, Calif.

[21] Appl. No.: 146,071

[22] Filed: May 2, 1980

[51] Int. Cl.³ .................. C23C 15/00; G21F 9/02
[52] U.S. Cl. ...................... 204/192 SP; 204/298; 252/630
[58] Field of Search ............ 204/192 SP, 298; 252/301.1 W

[56] References Cited

U.S. PATENT DOCUMENTS 4,051,063 9/1977 Nelson et al. ............... 252/301.1 W
4,094,762 6/1978 Clelland ........................ 204/192 EC

OTHER PUBLICATIONS

M. A. Bayne et al., "Krypton Entrapment in Pulse-Biased Sputter-Deposited Metals", *Thin Solid Films*, vol. 54, pp. 327-336 (1978).

Primary Examiner—Aaron Weisstuch
Attorney, Agent, or Firm—James F. Mitchell

[57] ABSTRACT

A method and apparatus which uses sputter cathode material in an ion sputter pump to discriminate between hydrogen or its isotopes and the pumped impurities by virtue of their different permeability or diffusion rates through and solubility in a film of sputtered cathode material. Iron and specific hydride-forming cathode materials are examples.

8 Claims, 3 Drawing Figures

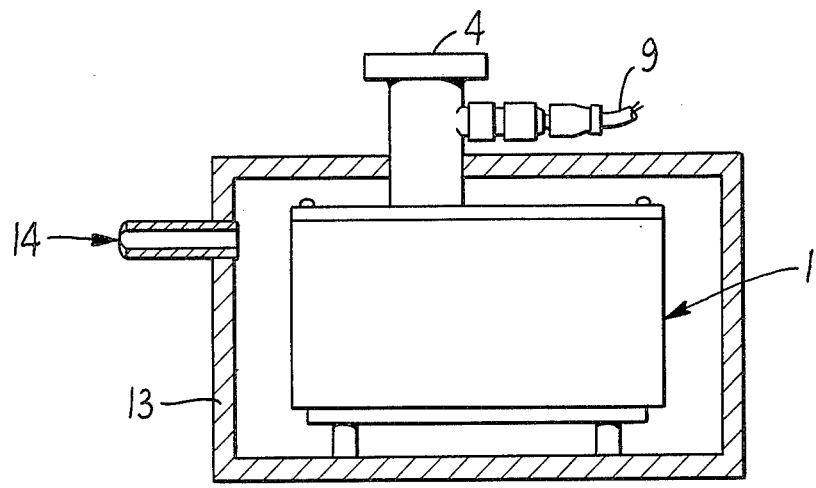
FIG. 1.
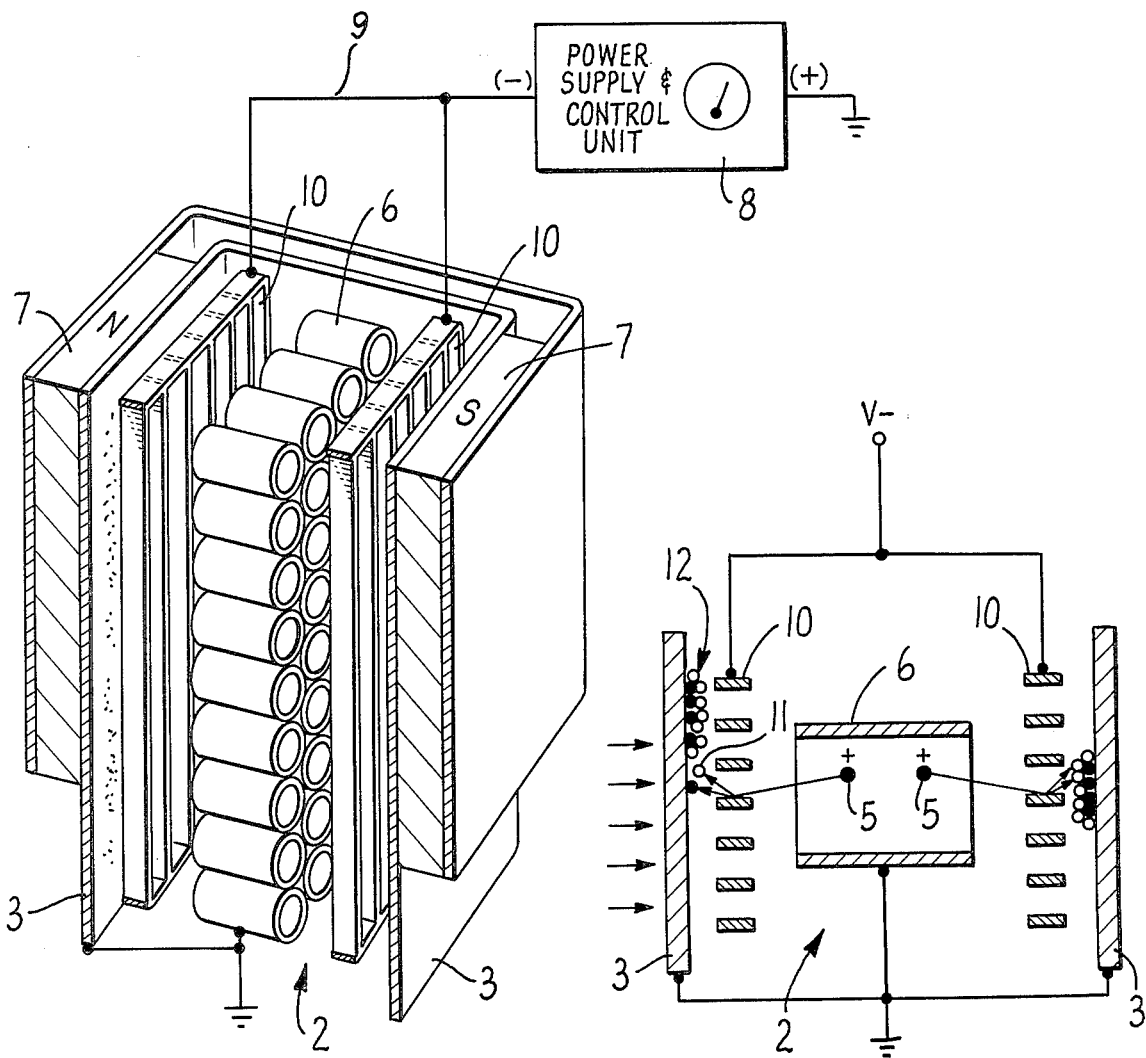
FIG. 2.
FIG. 3.

METHOD FOR PUMPING IMPURITIES, ESPECIALLY NOBLE GASES, FROM HYDROGEN OR MIXTURES OF HYDROGEN AND ITS ISOTOPES

BACKGROUND OF THE INVENTION

Controlled thermonuclear reactor experiments, and many accelerator based neutron generators, use the fusion reaction of deuterium and tritium nuclei. Efficient operation of these devices demands the removal of helium-4 as a reaction product and helium-3 as a decay product of the radioactive isotope tritium. Known methods for accomplishing such removal include the principles of chemisorption and desorption with the use of hydride-forming metals and the diffusion of hydrogen through metals like palladium. The former methods sacrifice a significant part of the hydrogen inventory and the latter methods require pressures far above the typical operating pressures of controlled thermonuclear reactors and neutron generator devices. Also, a major fraction of the total gas inventory must be treated to make removal of these impurities possible.

SUMMARY OF THE INVENTION

This invention is predicated on the discovery that the use of iron and specific hydride-forming alloys as a cathode in an ion sputter pump will selectively remove impurities, especially noble gases, oxygen, etc. by the "burial" and irreversible chemisorption mechanisms without also effectively removing hydrogen, deuterium, tritium or mixtures of them.

It is one object of the present invention to provide for the removal from hydrogen or its isotopes of impurities, including helium-4 and helium-3, at low pressures such as $10^{-3}$ to $10^{-8}$ torr, the operating pressure range for controlled thermonuclear reactors and neutron generators.

Another object is to provide a process utilizing an ion sputter pump for removing impurities, especially noble gases, from low pressure hydrogen or mixtures of hydrogen and its isotopes, deuterium and tritium, wherein the impurities are selectively buried by sputtered iron, nickel, copper or similar cathode material.

Still another object of the invention is a method and apparatus for selectively removing impurities from low pressure hydrogen or mixtures of hydrogen and its isotopes wherein the low pressure of the remaining gases can be controlled by reversible chemisorption of those gases in sputtered hydride-forming cathode material.

Other objects and advantages of the invention will become apparent upon consideration of the following description and drawings.

BRIEF DESCRIPTION OF THE DRAWINGS

FIG. 1 illustrates a typical sputter pump with a temperature control chamber useful in control of some aspects of this invention;

FIG. 2 is a perspective view of the operative interior components of the sputter pump; and FIG. 3 is a schematic diagram illustrating the pumping method.

The general principles or mechanisms upon which this invention depends are well-known in connection with ion sputter pumps. Such a pump 1 commonly includes, as shown in FIGS. 2 and 3, an evacuated zone 2 and a walled enclosure 3 of magnetically permeable material that confines the mixture of gases to be pumped from a vacuum vessel through inlet port 4 (FIG. 1). A portion of that confined mixture of gases is ionized in an electric discharge. In the illustrated embodiment, gas molecules 5 are ionized by an electric discharge within a multicell annular anode 6 which is magnetically confined between the poles 7 of a permanent or electromagnet. Power supply 8 provides a high negative potential through an insulated high voltage lead 9 to a set of sputter cathodes 10. The vane-shaped cathodes 10 are arranged between anode 6 and the enclosure wall 3, both of which are maintained at ground potential.

As is shown schematically in FIG. 3 ionized gas molecules 5 are accelerated toward the highly negative cathodes 10. Some of the ionized gas molecules 5 impinge upon the vanes of cathodes 10. The energy transfer upon impact, dislodges atoms of cathode material 11 is what is commonly called a "sputtering" process. The sputtered metal atoms 11 form a film 12 upon the enclosure wall 3 adjacent to the cathodes 10 and entrap gas molecules in the film. In the process of forming this film the metal atoms 11 of cathode material, heretofore typically titanium, may chemically react with active gases like oxygen, nitrogen and hydrogen and hence by chemisorption store or "pump" these gases within the film 12 formed on the enclosure 3. In addition, chemically inert impurities such as noble gases can similarly be efficiently stored or "pumped" by mechanically burying those molecules within the cathode material film 12 as it forms, as is illustrated in FIG. 3.

The present invention resides, in one embodiment, in the discovery that by replacing the conventional titanium cathodes with ones made preferably of iron, significant changes occur in the "pumping" process. More specifically, sputtered iron cathode material does not significantly chemisorb hydrogen or its isotopes, but will bury them. However, iron is dramatically more permeable to hydrogen and its isotopes than it is to noble gases. Hydrogen and its isotopes possess a high diffusion coefficient in the iron film, one which is much higher than those coefficients in iron for impurities such as the noble gases. Iron also has a low solubility for hydrogen and its isotopes. As a consequence, the use of iron as sputtered cathode material in an otherwise conventional ion sputter pump will remove the noble gases and other contaminants from the evacuated zone 2 by selectively isolating only them in the iron film 12 either by the burial mechanism or by chemisorption, respectively. Although hydrogen, deuterium and tritium atoms are also initially removed by the same burial mechanism, they are less soluble in and more readily diffuse back through the iron film 12 into the evacuated zone 2 within the pump.

The present invention may be practiced with various forms of ion sputter pumps. The noble "Vacion" pumps manufactured by Varian Associates of Palo Alto, California, are especially suited to be used in connection with this invention. In practicing the foregoing embodiment of the invention, it is merely necessary to substitute a cathode or cathodes made of iron for the titanium cathodes commonly provided. Nickel and copper, although less effective than iron, exhibit appropriate permeability or rapid diffusion rates and relatively low solubility for pumping hydrogen and its isotopes.

In operation of pumps so modified, a mixture of hydrogen or hydrogen and its isotopes, deuterium or tritium, and impurities, such as noble gases, are confined in the evacuated zone 2 of the pump under vacuum conditions, preferably in an operative low pressure range of $10^{-3}$ to $10^{-8}$ torr. A portion of the confined gases is then ionized in the magnetically-confined electric discharge. In the process, discharge electrons are trapped in orbits by the magnetic field between poles 7; the gases are ionized, as at 5, by collision with those electrons; the iron cathode 10 is sputtered by ion bombardment; and hydrogen and contaminant gas molecules that have migrated to the enclosure 3 are simultaneously "pumped" by burial within the film 12 of iron atoms 11. Inasmuch as hydrogen, deuterium and tritium have low solubility and at the appropriate temperature diffuse back through the iron film 12, those gases are returned to the evacuated zone 2 efficiently separated from impurities, such as helium-4 or helium-3 that remain buried in the iron film. The decelerating electric field between the grounded enclosure 3 and the negative cathode 10 retards re-sputtering of the impurities that are buried in the iron film 12.

The differential diffusion rate in iron as between hydrogen and its isotopes, on the one hand, and impurities, especially noble gases, on the other hand, at room temperature is sufficient to provide very effective pumping to remove the impurities. The coefficient of diffusion for hydrogen in iron at 20° C. is, for example $7 \times 10^{-6}$ cm$^2$. per second and for helium is immeasurably small at temperatures at or below 500 Kelvin. The solubility of hydrogen in iron is about one-half of one percent. However, in other than atmospheric environments, a temperature control chamber 13 shown in FIG. 1 may contain temperature control fluid circulated as at 14 to control the temperature of the enclosure 3 and entrapment film 12 formed upon it so as to maintain an appropriate diffusion rate.

This chamber 13 is useful in pumping systems where there is a need to store or release pumped hydrogen or its isotopes to adjust the operating pressure level within controlled thermonuclear reactors or neutron generators, for example. In such cases hydrogen or its isotopes may be added to or removed from the evacuated zone by reversibly chemisorbing them as a function of temperature within a film formed of hydride-forming material rather than the iron described above. The hydride-forming material also provides a differential diffusion rate as between free hydrogen and noble gas impurities. The pressure level in evacuated zone 2 is adjusted by the fluid within the chamber 13 to the temperature for the desired hydrogen partial pressure. In this variation, the cathodes are formed from hydride-forming metals and alloys, for example, rare earth and rare earth-like metals and binary and ternary alloys of them with the addition of transition metals like iron, nickel, cobalt, etc. Upon formation of the sputtered film 12, hydrogen and its isotopes form hydrides with the film by chemisorption that can be reversed by maintaining an appropriate elevated temperature within chamber 13. Helium and other noble gases are buried within the film in the same manner as is described for the iron embodiment. These impurities have sufficiently low diffusion coefficients in many hydride-forming materials to be effectively "pumped" by the burial mechanism.

A suitable hydride-forming material for cathode use which permits pumping of all gases, either by chemisorption or burial, in the described sputter pumps and also provides the option of reversing the chemisorption process for hydrogen and its isotopes by heating is the zirconium-aluminum alloy known as ST101 non-evaporable getter alloy marketed by SAES-GETTERS in Italy. It is 84 percent zirconium and 16 percent aluminum. Reversal of the hydride chemisorption occurs over the range of about 400°–800° C.

I claim:

1. A method for selectively pumping impurities from hydrogen and mixtures of hydrogen and its isotopes, comprising the steps of:
    confining a mixture of one or more of hydrogen and its isotopes and said impurities in an enclosure-defined evacuated zone;
    ionizing a portion of the mixture in an electric discharge within the zone;
    accelerating the ionized portion of the mixture to bombard a sputtering electrode;
    removing the mixture that migrates to said enclosure by entrapment within a film of dislodged electrode atoms formed upon said enclosure; and
    permitting hydrogen and its isotopes to diffuse out of said film and to return into the evacuated zone.

2. The method of claim 1 wherein the material of the sputtering electrode is iron.

3. The method of claim 1 wherein the material of the sputtering electrode is one of nickel and copper.

4. The method of claim 1 wherein entrapment of the impurities and initial entrapment of hydrogen and its isotopes in the film is by burial.

5. The method of claim 1 further comprising the step of controlling the temperature of the sputtered film to induce diffusion of hydrogen and its isotopes out of said film and to return into said evacuated zone.

6. The method of claim 4 wherein the material of the sputtering electrode is a hydride-forming material that reversibly chemisorbs hydrogen and its isotopes as a function of temperature.

7. The method of claim 5 wherein the hydride-forming material is zirconium-aluminum alloy.

8. The method of claim 1 wherein the impurities are at least one of the noble gases, oxygen and nitrogen.

* * * * *